United States Patent
Eldering

(10) Patent No.: US 10,206,012 B2
(45) Date of Patent: *Feb. 12, 2019

(54) QUEUE-BASED HEAD-END ADVERTISEMENT SCHEDULING METHOD AND APPARATUS

(71) Applicant: Prime Research Alliance E., Inc., Tortola (VG)

(72) Inventor: Charles A. Eldering, Doylestown, PA (US)

(73) Assignee: PRIME RESEARCH ALLIANCE E, INC. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,798

(22) Filed: Jan. 10, 2017

(65) Prior Publication Data

US 2017/0127149 A1    May 4, 2017

Related U.S. Application Data

(63) Continuation of application No. 14/988,195, filed on Jan. 5, 2016, now Pat. No. 9,544,631, which is a
(Continued)

(51) Int. Cl.
  *H04N 7/10*  (2006.01)
  *H04N 7/025*  (2006.01)
  (Continued)

(52) U.S. Cl.
  CPC ....... *H04N 21/812* (2013.01); *G06Q 30/0254* (2013.01); *H04N 7/165* (2013.01);
  (Continued)

(58) Field of Classification Search
  CPC ........... H04N 21/234; H04N 21/23424; H04N 21/251; H04N 21/252; H04N 21/236; H04N 21/2668; H04N 21/25891; H04N 21/25866
  See application file for complete search history.

(56) References Cited

U.S. PATENT DOCUMENTS

| | | |
|---|---|---|
| 4,602,279 A | 7/1986 | Freeman |
| 4,930,011 A | 5/1990 | Kiewit |

(Continued)

FOREIGN PATENT DOCUMENTS

| | | |
|---|---|---|
| CA | 2264392 | 1/1999 |
| WO | 9712486 | 4/1997 |

(Continued)

OTHER PUBLICATIONS

NCTA Technical Papers "Compressed Digital Commercial Insertion: New Technology Architectures for the Cable Advertising Business" 1992 8 pages.

(Continued)

*Primary Examiner* — James R Sheleheda
(74) *Attorney, Agent, or Firm* — The Belles Group, P.C.

(57) ABSTRACT

In one embodiment, a method of transmitting streaming media and advertisements to viewers at a plurality of viewer nodes is disclosed in which a plurality of viewer groups are created. Each viewer node is assigned to one of the plurality of viewer groups, wherein the assigning includes creating an advertising group map disclosing an advertising group to which each viewer belongs and transmitting the advertising group map to each viewer node. At the head end, at least one media stream is received including media content. A plurality of presentation streams is formed, each presentation channel corresponding to one of the viewer groups, by replicating the at least one media stream, each presentation channel including the media content and advertisements, wherein the advertisements replace previously scheduled advertisements. Each of the presentation channels is transmitted to at least one viewer node in said viewer group corresponding to said presentation channel.

7 Claims, 6 Drawing Sheets

Related U.S. Application Data continuation of application No. 11/412,750, filed on Apr. 27, 2006, now Pat. No. 9,232,252, which is a continuation of application No. 09/742,534, filed on Dec. 21, 2000, now Pat. No. 7,039,932.

(60) Provisional application No. 60/229,156, filed on Aug. 31, 2000.

(51) Int. Cl.

| | |
|---|---|
| *H04N 21/81* | (2011.01) |
| *H04N 21/234* | (2011.01) |
| *H04N 21/25* | (2011.01) |
| *H04N 7/16* | (2011.01) |
| *H04N 21/258* | (2011.01) |
| *H04N 21/262* | (2011.01) |
| *H04N 21/2668* | (2011.01) |
| *H04N 21/426* | (2011.01) |
| *G06Q 30/02* | (2012.01) |
| *H04N 21/45* | (2011.01) |
| *H04N 21/61* | (2011.01) |
| *H04N 21/854* | (2011.01) |

(52) U.S. Cl.
CPC ..... *H04N 21/23424* (2013.01); *H04N 21/252* (2013.01); *H04N 21/25883* (2013.01); *H04N 21/25891* (2013.01); *H04N 21/2668* (2013.01); *H04N 21/26225* (2013.01); *H04N 21/26233* (2013.01); *H04N 21/26241* (2013.01); *H04N 21/42684* (2013.01); *H04N 21/4532* (2013.01); *H04N 21/6125* (2013.01); *H04N 21/85406* (2013.01)

(56) References Cited

U.S. PATENT DOCUMENTS

| | | |
|---|---|---|
| 5,029,014 A | 7/1991 | Lindstrom |
| 5,099,319 A | 3/1992 | Esch et al. |
| 5,155,591 A | 10/1992 | Wachob |
| 5,231,494 A | 7/1993 | Wachob |
| 5,271,626 A | 12/1993 | Llenas et al. |
| 5,319,455 A | 6/1994 | Hoarty et al. |
| 5,400,166 A | 3/1995 | Huber |
| 5,410,344 A | 4/1995 | Graves et al. |
| 5,424,770 A | 6/1995 | Schmelzer et al. |
| 5,425,100 A | 6/1995 | Thomas et al. |
| 5,446,919 A | 8/1995 | Wilkins |
| 5,457,562 A | 10/1995 | Tremblay |
| 5,515,098 A | 5/1996 | Cartes |
| 5,532,732 A | 7/1996 | Yuen et al. |
| 5,534,911 A | 7/1996 | Levitan |
| 5,550,578 A * | 8/1996 | Hoarty ............... G06F 3/04815 348/E5.056 |
| 5,559,549 A | 9/1996 | Hendricks et al. |
| 5,565,909 A | 10/1996 | Thibadeau et al. |
| 5,574,860 A | 11/1996 | Perlman et al. |
| 5,579,055 A | 11/1996 | Hamilton et al. |
| 5,585,858 A | 12/1996 | Harper et al. |
| 5,592,551 A | 1/1997 | Lett et al. |
| 5,600,364 A | 2/1997 | Hendricks et al. |
| 5,600,366 A | 2/1997 | Schulman |
| 5,600,573 A | 2/1997 | Hendricks et al. |
| 5,604,542 A | 2/1997 | Dedrick |
| 5,612,742 A | 3/1997 | Krause et al. |
| 5,621,728 A | 4/1997 | Lightfoot et al. |
| 5,635,978 A | 6/1997 | Alten et al. |
| 5,636,346 A | 6/1997 | Saxe |
| 5,650,994 A | 7/1997 | Daley |
| 5,652,615 A | 7/1997 | Bryant et al. |
| 5,657,072 A | 8/1997 | Aristides et al. |
| 5,659,367 A | 8/1997 | Yuen |
| 5,661,516 A | 8/1997 | Carles |
| 5,687,095 A | 11/1997 | Haskell |
| 5,694,176 A | 12/1997 | Bruette et al. |
| 5,708,664 A | 1/1998 | Budge et al. |
| 5,724,091 A | 3/1998 | Freeman et al. |
| 5,724,521 A | 3/1998 | Dedrick |
| 5,740,549 A | 4/1998 | Reilly et al. |
| 5,752,160 A | 5/1998 | Dunn |
| 5,752,238 A | 5/1998 | Dedrick |
| 5,758,257 A | 5/1998 | Herz et al. |
| 5,758,328 A | 5/1998 | Giovannoli |
| 5,761,601 A | 6/1998 | Nemirofsky et al. |
| 5,774,170 A | 6/1998 | Hite et al. |
| 5,781,226 A | 7/1998 | Sheehan |
| 5,790,426 A | 8/1998 | Robinson |
| 5,790,935 A | 8/1998 | Payton |
| 5,801,747 A | 9/1998 | Bedard |
| 5,801,753 A | 9/1998 | Eyer et al. |
| 5,805,974 A | 9/1998 | Hite et al. |
| 5,808,694 A | 9/1998 | Usui et al. |
| 5,815,671 A | 9/1998 | Morrison |
| 5,848,352 A | 12/1998 | Dougherty et al. |
| 5,861,919 A | 1/1999 | Perkins et al. |
| 5,886,731 A | 3/1999 | Ebisawa |
| 5,892,535 A | 4/1999 | Allen et al. |
| 5,917,830 A | 6/1999 | Chen et al. |
| 5,918,014 A | 6/1999 | Robinson |
| 5,926,205 A | 7/1999 | Krause et al. |
| 5,931,901 A | 8/1999 | Wolfe et al. |
| 5,948,061 A | 9/1999 | Merriman et al. |
| 5,966,120 A | 10/1999 | Arazi et al. |
| 5,969,715 A | 10/1999 | Dougherty et al. |
| 5,978,381 A | 11/1999 | Perlman et al. |
| 5,990,927 A | 11/1999 | Hendricks et al. |
| 6,002,393 A | 12/1999 | Hite et al. |
| 6,002,394 A | 12/1999 | Schein et al. |
| 6,009,409 A | 12/1999 | Adler et al. |
| 6,009,410 A | 12/1999 | Lemole et al. |
| 6,020,880 A | 2/2000 | Naimpally |
| 6,020,883 A | 2/2000 | Herz et al. |
| 6,026,368 A | 2/2000 | Brown et al. |
| 6,026,369 A | 2/2000 | Capek |
| 6,029,045 A | 2/2000 | Picco et al. |
| 6,038,256 A | 3/2000 | Linzer et al. |
| 6,055,510 A | 4/2000 | Henrick et al. |
| 6,061,097 A | 5/2000 | Satterfield |
| 6,088,722 A | 7/2000 | Herz et al. |
| 6,119,098 A | 9/2000 | Guyot et al. |
| 6,141,010 A | 10/2000 | Hoyle |
| 6,144,653 A | 11/2000 | Persson et al. |
| 6,160,570 A | 12/2000 | Sitnik |
| 6,160,989 A | 12/2000 | Hendricks et al. |
| 6,177,931 B1 | 1/2001 | Alexander et al. |
| 6,181,334 B1 | 1/2001 | Freeman et al. |
| 6,252,634 B1 | 6/2001 | Yuen et al. |
| 6,253,238 B1 | 6/2001 | Lauder et al. |
| 6,263,501 B1 | 7/2001 | Schein et al. |
| 6,284,153 B1 | 9/2001 | Miller et al. |
| 6,314,094 B1 | 11/2001 | Boys |
| 6,324,519 B1 | 11/2001 | Eldering |
| 6,357,042 B2 | 3/2002 | Srinivasan et al. |
| 6,378,130 B1 | 4/2002 | Adams |
| 6,418,122 B1 | 7/2002 | Schoenblum et al. |
| 6,425,131 B2 | 7/2002 | Crandall et al. |
| 6,434,747 B1 | 8/2002 | Khoo et al. |
| 6,446,082 B1 | 9/2002 | Arita |
| 6,446,261 B1 | 9/2002 | Rosser |
| 6,459,427 B1 | 10/2002 | Mao et al. |
| 6,460,179 B1 | 10/2002 | Kretz et al. |
| 6,463,585 B1 | 10/2002 | Hendricks et al. |
| 6,493,875 B1 | 10/2002 | Eames et al. |
| 6,487,721 B1 | 11/2002 | Safadi |
| 6,505,169 B1 | 1/2003 | Bhagavath et al. |
| 6,516,002 B1 | 2/2003 | Huang et al. |
| 6,583,825 B1 | 6/2003 | Yuen et al. |
| 6,584,153 B1 | 6/2003 | Gordon et al. |
| 6,615,039 B1 | 9/2003 | Eldering |
| 6,631,523 B1 | 10/2003 | Matthews, III et al. |
| 6,675,385 B1 | 1/2004 | Wang |
| 6,684,194 B1 | 1/2004 | Eldering et al. |

(56) References Cited

U.S. PATENT DOCUMENTS

| | | |
|---|---|---|
| 6,698,020 B1 | 2/2004 | Zigmond et al. |
| 6,704,930 B1 | 3/2004 | Eldering et al. |
| 6,718,551 B1 | 4/2004 | Swix et al. |
| 6,724,974 B2 | 4/2004 | Naruto et al. |
| 6,738,983 B1 | 5/2004 | Rao et al. |
| 6,754,905 B2 | 6/2004 | Gordon et al. |
| 6,796,555 B1 | 9/2004 | Blahut |
| 6,820,277 B1 | 11/2004 | Eldering et al. |
| 7,017,173 B1 * | 3/2006 | Armstrong ............ H04N 5/445 348/E5.099 |
| 7,039,932 B2 * | 5/2006 | Eldering ............... H04N 7/165 348/E7.063 |
| 7,490,053 B1 | 2/2009 | Emerson et al. |
| 7,756,743 B1 * | 7/2010 | Lapcevic ............... G06Q 30/02 705/14.1 |
| 8,418,195 B1 | 4/2013 | Page et al. |
| RE44,477 E | 9/2013 | Emerson et al. |
| 8,631,431 B2 | 1/2014 | Berberet et al. |
| 9,232,252 B2 * | 1/2016 | Eldering ............... H04N 7/165 |
| 9,544,631 B2 * | 1/2017 | Eldering ............... H04N 7/165 |
| 2001/0013124 A1 | 8/2001 | Klosterman et al. |
| 2001/0013131 A1 * | 8/2001 | Wang ................... H04N 5/782 725/100 |
| 2001/0023436 A1 | 9/2001 | Srinivasan et al. |
| 2001/0032333 A1 | 10/2001 | Flickinger |
| 2001/0056577 A1 | 12/2001 | Gordon et al. |
| 2002/0026645 A1 | 2/2002 | Son et al. |
| 2002/0038455 A1 | 3/2002 | Srinivasan et al. |
| 2002/0042924 A1 | 4/2002 | Adams |
| 2002/0067730 A1 | 6/2002 | Hinderks et al. |
| 2002/0083439 A1 | 6/2002 | Eldering |
| 2002/0083443 A1 | 6/2002 | Eldering et al. |
| 2002/0087975 A1 | 7/2002 | Schlack |
| 2002/0087976 A1 | 7/2002 | Kaplan et al. |
| 2002/0104083 A1 | 8/2002 | Hendricks et al. |
| 2002/0129374 A1 | 9/2002 | Freeman et al. |
| 2002/0152471 A1 | 10/2002 | De Haas |
| 2003/0088872 A1 | 5/2003 | Maissel et al. |
| 2003/0200128 A1 | 10/2003 | Doherty |
| 2004/0163101 A1 | 8/2004 | Swix et al. |
| 2004/0205829 A1 | 10/2004 | Hane |
| 2007/0157231 A1 | 7/2007 | Eldering et al. |
| 2012/0192224 A1 | 7/2012 | Eldering et al. |
| 2014/0013354 A1 | 1/2014 | Johnson et al. |

FOREIGN PATENT DOCUMENTS

| | | | |
|---|---|---|---|
| WO | 9717774 | 5/1997 | |
| WO | 9827723 | 6/1998 | |
| WO | 9926415 | 5/1999 | |
| WO | WO-9926415 A1 * | 5/1999 | ......... H04N 7/17345 |
| WO | 9952285 | 10/1999 | |
| WO | 9965237 | 12/1999 | |
| WO | 9966719 | 12/1999 | |
| WO | 0005888 | 2/2000 | |
| WO | 0049801 | 8/2000 | |
| WO | 0054504 | 9/2000 | |
| WO | 0069163 | 11/2000 | |
| WO | 0147279 | 6/2001 | |
| WO | 0233973 | 4/2002 | |
| WO | 0233975 | 4/2002 | |

OTHER PUBLICATIONS

AdLink Engineering, Ad insertion wiring diagrams, 1999, 17 pages.

* cited by examiner

| MAC ID | GROUP |
|---|---|
| E135642X579864HJ | B |
| E135642X579865HJ | C |
| E135642X579866HJ | D |
| E135642X579867HJ | D |
| E135642X579868HJ | A |
| ⋮ | ⋮ |
| E135642X579954HJ | D |
| E135642X579955HJ | A |
| E135642X579956HJ | A |

FIG. 1A

| PROGRAM CHANNEL | PRESENTATION CHANNELS | VPI/VCI |
|---|---|---|
| CBS | CBS<br>CBS_A<br>CBS_B<br>CBS_C<br>.<br>.<br>.<br>CBS_N | 234/345<br>234/346<br>234/347<br>234/348<br>.<br>.<br>.<br>234/XXX |
| FOX | FOX<br>FOX_A<br>FOX_B<br>FOX_C<br>.<br>.<br>.<br>FOX_N | 456/123<br>456/124<br>456/125<br>456/126<br>.<br>.<br>.<br>456/XXX |
| .<br>.<br>. | | |
| UPN | UPN<br>UPN_A<br>UPN_B<br>UPN_C<br>.<br>.<br>.<br>UPN_N | 895/587<br>895/588<br>895/589<br>895/590<br>.<br>.<br>.<br>895/XXX |

*FIG. 1B*

| PRESENTATION STREAM | VPI/VCI | CHANNEL NO. |
|---|---|---|
| CBS_C | 234/348 | 4 |
| FOX_C | 456/126 | 5 |
| . . . | | |
| UPN_C | 895/590 | 6 |

*FIG. 1C*

QUEUE-BASED HEAD-END ADVERTISEMENT SCHEDULING METHOD AND APPARATUS

CROSS REFERENCE TO RELATED APPLICATIONS

This application is a continuation of U.S. patent application Ser. No. 14/988,195 (now U.S. Pat. No. 9,544,631), entitled Queue-Based Head-End Advertisement Scheduling Method and Apparatus, filed Jan. 5, 2016, which is a continuation of U.S. patent application Ser. No. 11/412,750 (now U.S. Pat. No. 9,232,252), entitled Queue-Based Head-End Advertisement Scheduling Method and Apparatus, filed Apr. 27, 2006, which is a continuation of U.S. patent application Ser. No. 09/742,534 (now U.S. Pat. No. 7,039,932), entitled Queue-Based Head-End Advertisement Scheduling Method and Apparatus, filed Dec. 21, 2000, which claims the benefit of U.S. Provisional Patent Application No. 60/229,156, entitled Method and System for Addressable and Program Independent Advertising, filed Aug. 31, 2000, the disclosures of which are incorporated herein by reference in their entirety.

FIELD OF THE INVENTION

The invention pertains to advertising. More particularly, the invention pertains to targeted advertising in television programming or other media delivery systems.

BACKGROUND OF THE INVENTION

As used herein, the term "television service delivery system" refers to any method and/or apparatus for delivering television programming to viewers, including, but not limited to, digital broadcast satellite (DBS), analog cable networks, digital cable networks, switched digital video (SDV) networks delivered via a telephone connection, and land-based radio frequency antenna broadcast.

The various modes of delivering television service, including those mentioned above, are herein termed "transport mechanisms" or "transport streams". The term "television service provider" refers to an entity that provide television service delivery systems, e.g., a local cable television company in the case of analog or digital cable. The term "subscriber" refers to any individual, household or other entity that receives television service from a television service provider. In almost all television service delivery systems other than land-based antenna broadcasts, the subscriber actually enters into a service contract with the television service provider in order to subscribe to the television service. In land-based antenna television service, anyone with a television in the geographic area reached by the broadcaster can receive the television service without any contract with the broadcaster. Nevertheless, in this specification, the term "subscriber" is intended to include such entities. The term head-end refers to the node of the network or other television service delivery system from which television programming is transmitted to the receiving nodes, i.e., to the subscriber nodes.

Television service delivery systems typically deliver a plurality of channels of television programming to subscribers. The subscribers, through channel selection via a set-top box (STB) or through the tuner of the television itself, select one or more of those channels to view at any given time. Traditionally, television service providers transmit the same data on each channel to all of its subscribers. Specifically, each programming channel contains the exact same content, including advertisements, for all subscribers.

Many television service delivery systems, including analog cable, digital cable, DBS and SDV employ STBs that the subscriber must couple between the incoming signal (e.g., the cable, antenna or telephone line) and his or her television set(s). These STBs can provide substantially enhanced functionality to the television service provider as well as the subscriber. For instance, the STBs can be programmed to either allow or not allow the subscriber to view certain programming channels. As is well known to any cable television subscriber, certain channels are considered premium channels and cost extra to receive. Thus, if a person selects to receive certain premium channels, the subscriber's STB is programmed to de-scramble those channels (if transmitted in a scrambled format) or otherwise not block the subscriber's ability to view them.

Most television channels include both programming and advertisements interspersed throughout the programming. Typically, a particular advertiser will purchase a particular "spot", i.e., an advertising opportunity in a particular channel at a particular time, based on the likelihood that members of that advertiser's target audience will be watching that particular channel at that particular time. For instance, advertisers typically have a particular demographic group of individuals that they wish to reach with their advertising. For example, the manufacturer of a low-cost beer probably has a primary target audience of males between the ages of 21 and 39, living in households with a household annual income of less than $75,000 per year. As another example, a manufacturer of laundry detergent may have a primary target audience of women between 19-59 years of age with no particular preference regarding household income. As another example, a manufacturer of expensive beer may wish to have a target audience similar to that of the manufacturer of low-cost beer in that it comprises males between the ages of 21 and 39. However, this manufacturer's target demographic audience may include a different economic profile, e.g., males between the ages of 21 and 39, living in households with annual household incomes of over $60,000 per year. Another advertiser that manufactures children's toys appropriate for children between 5 and 10 years of age might have a target audience of children between the ages of 5 and 10 and, depending upon the particular toys, a desired annual household income range.

Factors such as time of day and the particular program that is being broadcast on a particular channel can be used as predictors of the type of persons likely to be watching the television and particular channel when a particular advertisement is displayed. For instance, children are more likely to be viewing television during the daytime than adults. Further, men are more likely to be watching sporting events than women. However, time of day and type of program are not perfect indicators of the viewing audience. For instance, Monday Night Football traditionally would be considered a program/timeslot that would present advertisers with a large number of male viewers between the ages of 21 and 39. However, those viewers are likely to span the entire annual household income range. Accordingly, a large portion of the target audiences of both the low-cost beer manufacturer and the premium beer manufacturer can be expected to view Monday Night Football. However, by the same token, both beer manufacturers will pay a premium price to advertise during Monday Night Football, even though a large portion of the audience does not comprise their target audience. For instance, the premium beer manufacturer will be reaching many men living in households within a lower income range who are unlikely to purchase the premium beer because of its high cost. That manufacturer nevertheless pays the premium price for that advertising spot.

Accordingly, it is an object of the present invention to provide an improved method and apparatus for advertising in television and other media.

It is another object of the present invention to provide a method and apparatus for more narrowly reaching one's target audience in television advertising.

It is a further object of the present invention to provide a method and apparatus by which advertisements can be inserted into television programming channels in a more targeted fashion than traditional advertising mechanisms.

SUMMARY OF THE INVENTION

The invention is a method and apparatus for delivering targeted advertising to persons who receive a media stream such as television. While the invention is particularly suitable for use in connection with television service delivery systems, and particularly those utilizing STBs or the equivalent, it can be applied to other media streams such as the Internet, and audio-only streams that might be delivered via DBS, analog cable, digital cable or SDV.

In accordance with the invention, for each channel containing different television programming, a television service provider transmits multiple versions of that channel in which the programming is identical but the advertisements are different. This allows television service providers to offer advertisers more targeted advertising other than simply based on channel, time of day, and programming. For instance, a single programming channel, e.g., VH1, can be duplicated four times at the head end of a television service network to create four presentation channels. Different advertisements can be inserted into each of the four presentation channels with the different presentation channels delivered to different groups of subscribers. The subscriber groups may be grouped by nodes of a cable television network with the provider delivering the different presentation channels to different nodes.

Alternately, subscriber groups may be created by transmitting all presentation channels to all subscribers, but individually programming the set-top boxes of the individual subscribers to pick out a particular one of the multiple presentation channels corresponding to each programming channel. The set-top boxes can be programmed before being delivered to the subscribers or can be programmed by the provider via the communication network after they are coupled to the network by the subscriber.

In accordance with the invention, the television service provider inserts different advertisements into the different presentation channels at the head end using a queue-based method and apparatus. In accordance with the invention, a queue of advertisement resource locators (ARLs) is maintained for each transmitted presentation channel. In a simple embodiment, there is one queue for each presentation channel. The ARLs comprise information disclosing the location of a corresponding advertisement. The actual advertisements are stored elsewhere and preferably are stored in a digital format such as MPEG. They may be stored in a memory local to the head end of the television service delivery system or may be stored elsewhere accessible by the head end computer system via the television service delivery network or a separate communication network. At the simplest level, ARLs essentially comprise pointers to the actual advertisements.

ARLs are stacked in the queue in the order in which they are to be inserted into the corresponding programming channel. The avails in the programming channel within which the advertisements are to be inserted are determined by any reasonable means and the advertisements are inserted within those avails. For example, the television service provider may be given data in advance disclosing where the avails are in the programming channel. In other embodiments, the beginning of avails may be indicated by a predetermined signal in the vertical blanking interval of the video stream or by cue tones.

BRIEF DESCRIPTION OF THE DRAWINGS

FIG. 1A is an exemplary system-wide advertisement group map in accordance with the present invention that may be stored at the head end for transmission to the set-top boxes in order to enable the set-top boxes to formulate their own individual channel maps.

FIG. 1B is an exemplary system-wide channel map that may be stored at the head end for transmission to the set-top boxes for purposes of creating their individual channel maps.

FIG. 1C is an exemplary individual channel map for a particular STB in accordance with the present invention.

DETAILED DESCRIPTION OF THE INVENTION

Figure 2:
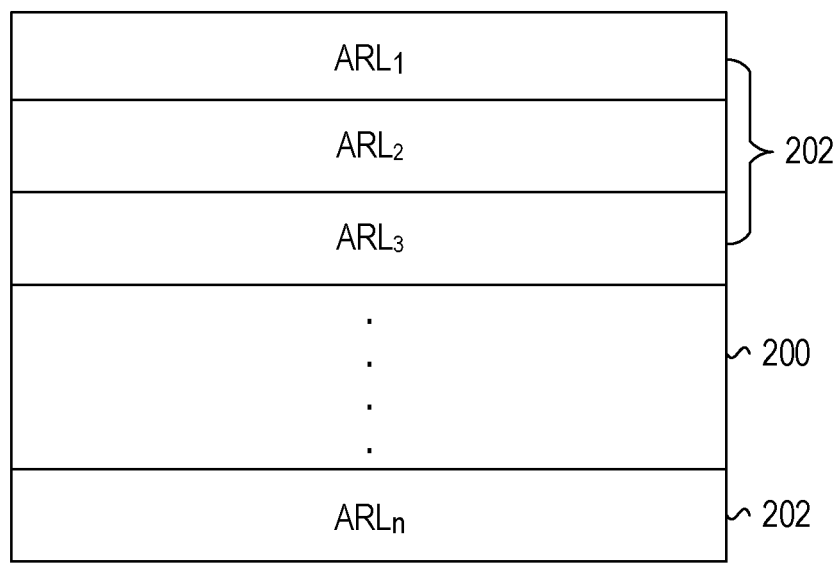
FIG. 2 is a logic diagram illustrating an advertisement resource locator queue stored in memory in accordance with the present invention.

In accordance with the invention, a television service provider (TSP) receives a plurality of television programming channels (e.g., ABC, NBC, CBS, FOX, UPN) containing television programming as well as spaces interspersed within the programming for advertisements. Such advertisement intervals are herein termed "avails". Some, all or none of the avails may be filled with advertisements as delivered to the television service provider, while some all or none of the avails may be empty with the intent that the TSP insert advertisements into them. The advertisement insertion scheme of the present invention may be used to insert advertisements either into only the empty avails in a programming channel or to replace some or all of the advertisements that are already in some of the avails as delivered to the TSP.

One or more of the incoming programming channels is replicated, for example, by an audio/video splitter circuit, to produce multiple identical output channels. The same process is repeated for any number of other programming channels.

In accordance with a preferred embodiment of the invention, the selection of the particular presentation channel when a viewer selects a particular programming channel is transparent to the subscriber/viewer. That is, the subscriber selects only a particular programming channel, e.g., ABC, and the set-top box picks a particular one of the multiple presentation channels corresponding to ABC, e.g., ABC_1, ABC_2, ABC_3 or ABC_4.

This can be accomplished in many ways depending on the available bandwidth for transmitting television channels to the subscribers, the particular transport mechanism and other factors. In one scheme, preferable for high bandwidth transport mechanisms such as analog cable, digital cable and DBS, all of the presentation channels are transmitted over a high bandwidth mechanism and each of the subscribers has a set-top box or other mechanism programmed to select one of the presentation channels corresponding to each programming channel.

A similar scheme can be employed in an SDV system with slight modification. As is well known, in SDV systems, in which bandwidth is much more limited than in cable systems, typically only one or a few channels can be transmitted to a subscriber at any given time. Accordingly, whenever a subscriber selects a programming channel to view, a signal is sent from the subscribers STB to the head-end or to a curb side node of the network asking for the selected channel to be transmitted to the subscriber. Accordingly, in SDV systems, the scheme may be essentially identical to that described above for cable networks, except that, instead of picking out the particular presentation channel corresponding to the selected programming channel for the advertising group to which that subscriber has been assigned, the STB is programmed to request the particular presentation channel from the head end. This SDV scheme can be implemented on commercially available SDV systems including the NLevel³ platform which is manufactured and sold by Next Level Communications.

In accordance with the invention, each subscriber is assigned to an advertising group wherein the assigned advertising group dictates which of the presentation channels corresponding to each programming channel that subscriber will receive when selecting that programming channel.

One preferred method is for each subscriber to have a set-top box which has stored in memory a tag identifying the advertising group to which it belongs. This tag may be programmed into the STB memory by the television service provider before it is delivered to the subscriber. Alternately, the STB may be programmed to accept data assigning it to a particular advertising group via the television service delivery system itself. In one embodiment, one channel in the transport mechanism (preferably a low bandwidth channel) can be reserved for sending advertising group assignments and other instructions to the set-top boxes.

Each set-top box can be assigned a unique identification code which can be used in conjunction with system-wide channel and advertising group maps received over the instruction channel to determine its advertising group. An advertising group map may be generated at the head end and transmitted over this instruction channel to all subscribers.

FIG. 1A illustrates an exemplary advertising group map 101 that may be stored at the head end and transmitted via the instruction channel to all of the subscribers in an SDV television service system. The map identifies an advertising group 103 for every STB on the system. Each individual STB receives the map 101 and matches its identification number to an identification number 105 in the map to determine to which advertising group it belongs. FIG. 1B illustrates a presentation channel map 111 which also may be broadcast from the head end to all STBs. As shown in FIG. 1B, the presentation channel map identifies which presentation channel 113 for each programming channel 115 corresponds to which advertising group. It also identifies the information 117 needed by the STBs to tune into the particular presentation streams.

FIGS. 1A and 1B illustrate a presentation channel map for an SDV system utilizing the telephone lines and very high speed digital subscriber lines (VDSL) modems. As well known in the SDV art, the unique STB identifiers are Media Access Control Identifications (MAC_IDs) and the presentation channel tuning information 117 comprises a virtual identifier/virtual channel identifiers (VPI/VCIs) 117. In other systems, such as analog cable, digital cable and DBS, the STB identifiers could take any reasonable form and the presentation channel information 117 could be the particular frequencies to which the individual presentation channels correspond, rather than VPI/VCI identifiers.

By correlating the data received in the advertising group map of FIG. 1A and the presentation channel map of FIG. 1B, each individual STB can create an individual channel map 121 for itself as illustrated in FIG. 1C.

FIG. 1C illustrates the map 121 which will be built by an STB assigned to advertising group C. The map indicates which particular VPI/VCI 123 (i.e., presentation channel 125) to select when the user selects a particular programming channel 127.

In systems which are not based on ATM but instead use analog video channels or digital video streams (e.g. MPEG) to transport video, the channel map will refer to a particular frequency (in the case of analog video) or a particular Program ID (PID) in the case of MPEG.

The particular advertising group to which each subscriber is assigned may be chosen by the television service provider based on available information about that subscriber that is relevant to the type of advertising most beneficial for that subscriber. Such information may include publicly available probabilistic demographic and/or psycho-graphic information based on the address of the subscriber. For instance, a handful of marketing firms in the United States provide information about fixed groups known as "clusters" for use by advertisers in identifying members of their target audiences. "Clusters", well known in the field of advertising, are groups of neighborhoods in the United States having certain similar characteristics such as socio-economic, demographic and/or psycho-graphic characteristics. To form clusters, these marketing firms have examined the characteristics of all known neighborhoods in the country using census or other publicly available data, have selected certain grouping characteristics (e.g., average family income, average family age, etc.) and have combined some of the neighborhoods with similar grouping characteristics into clusters. Examples of marketing firms known to provide "cluster" services are Claritas Inc., with its PRIZM™ cluster system identifiable by zip+4 codes, CACI INC., with its Acorn™ system, and National Decision Systems, Inc., with its Vision™ system.

Alternately or additionally, subscribers may simply be asked to fill out questionnaires disclosing such information such as age and gender, ethnicity and income of the members of the household when they sign up as subscribers with the television service provider.

In one embodiment of the invention, each programming channel is split into the same number of presentation channels as there are advertising groups. However, there is no requirement that all of the programming channels be split into multiple presentation channels or that those that are split into multiple presentation channels be split into the same number of presentation channels. In fact, there may be more advertising groups than presentation channels corresponding to any single programming channel.

In accordance with the present invention, the schedule for inserting advertisements into each of the presentation channels is achieved by using a queue stored in memory. FIG. 2 is a pictorial representation of a queue in accordance with the present invention. The queue 200 is a stacked list of advertisement identifiers, hereinafter termed advertisement resource locators (ARLs) 202. At a minimum, the ARLs indicate the location of a particular advertisement, which may be a memory address in a large volume memory local to the head end of the system. Alternately, the ARLs may point to a remote server on a network to which the head end computer is coupled. For instance, the advertisement may be stored at a remote location on the advertisers server, to which the television service provider is coupled via a network. Such an embodiment is advantageous in that any changes that the advertiser wishes to make to the advertisements, including substituting an entirely new advertisement for an older one, can be made by the advertiser on the advertiser's server any time before the advertisement is accessed for display, without the need for the television service provider's attention.

Preferably, the ARLs also indicate other information about the advertisement, such as the duration of the advertisement, the identity of the advertiser and the identity of the particular advertisement, which information may be useful for purposes of billing advertisers for display of their advertisements.

In a preferred embodiment of the invention, the queue comprises a stack of ARLs in the order in which they are to be inserted into the corresponding presentation channel. However, it will be understood by those of skill in the related arts that the "order" of the ARLs need not necessarily correspond to the numerical addresses of the ARLs in the queue, but encompasses any ordering algorithm that may be used to retrieve ARLs from the queue. For instance, the ARLs may include a time tag indicating the time that the corresponding advertisement is to be inserted into the presentation channel. U.S. patent application Ser. No. 09/635,542, entitled "Grouping Subscribers Based On Demographic Data", filed on Aug. 10, 2000, assigned to the same assignee as the present application and incorporated herein by reference, discloses a television service delivery method and apparatus into which the present invention can be incorporated.

Figure 3:
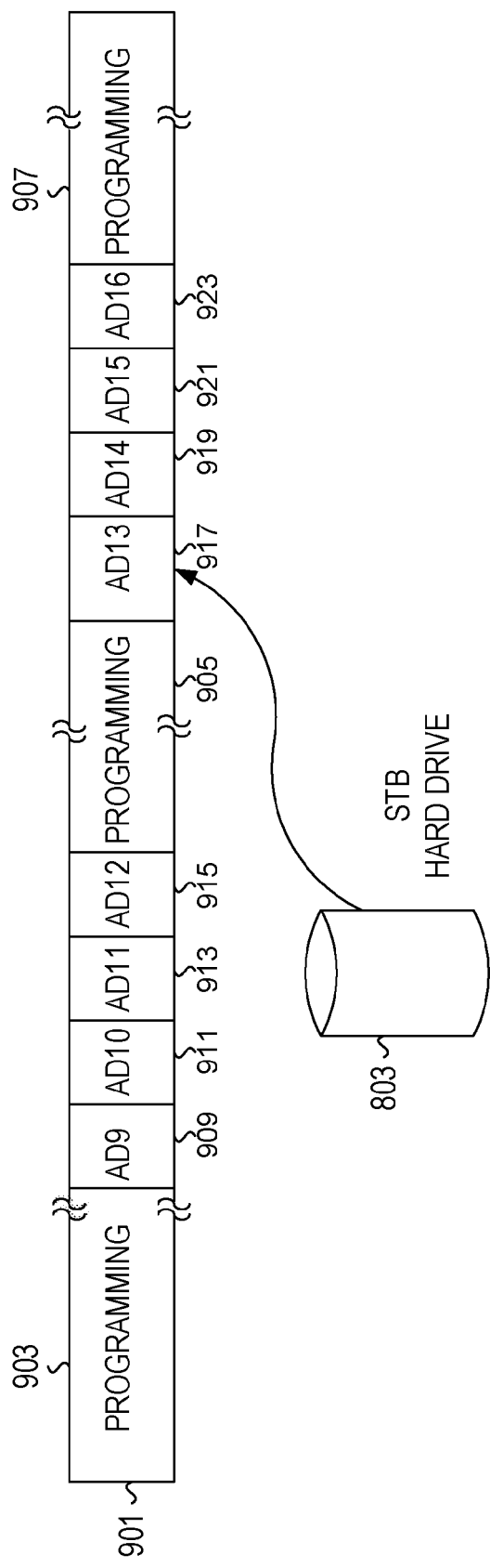
FIG. 3 is a logical representation illustrating advertisement insertion into a plurality of presentation channels corresponding to one programming channel in accordance with the present invention.

FIG. 3 illustrates dynamic substitution and insertion of advertisements in one presentation channel in accordance with the present invention. As shown in FIG. 3, there exists a first programming channel 901 having programming segments 903, 905, 907 and a plurality of advertisement segments (i.e., avails) 909, 911, 913, 915, 917, 919, 921, 923. The start of each avail is determined by any available scheme such as detection of digital cue tones, detection of a blank picture for a predetermined duration (which usually indicates the beginning of a commercial break in television programming), or detection of a predetermined signal in the vertical blanking interval. The aforementioned provisional application as well as U.S. patent application Ser. No. 09/712,790, filed on or about Nov. 14, 2000, entitled "Queue Based Advertisement Scheduling and Sales", incorporated herein by reference, discuss these and other ways of determining the location of avails in a programming channel. Alternately, the television service provider simply may have a schedule indicating the times of all upcoming avails in the programming channel.

When the beginning of an avail, e.g., avail 917, is detected or otherwise determined by the AIS in the data stream 901, the AIS retrieves the appropriate advertisement (as determined by consultation of the queue) from memory 803 and inserts it into the avail 917.

Figure 4:
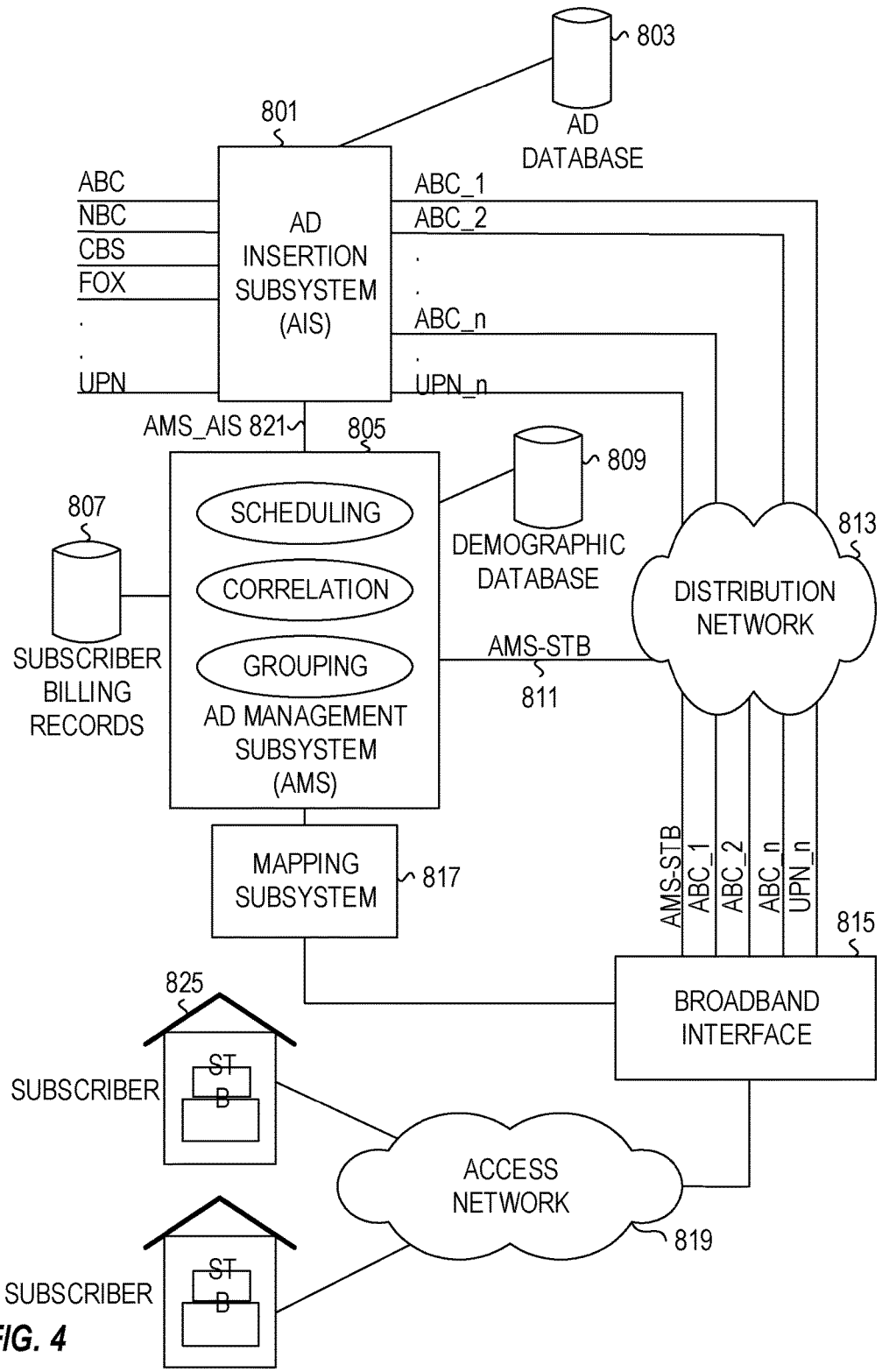
FIG. 4 is a block diagram of a queue-based, head-end advertisement scheduling and insertion apparatus in accordance with one embodiment of the present invention.

FIG. 4 is a block diagram of a head end advertisement insertion module in accordance with the present invention for an exemplary SDV system. FIG. 4 is merely exemplary of one particular potential embodiment of the invention and is not limiting. An advertisement insertion subsystem (AIS) 801 coupled to an advertisement management subsystem (AMS) 805 is provided. The AIS 801 receives one or more programming channels, e.g., ABC, NBC, CBS, FOX, UPN, and creates a plurality of presentation channels, e.g., ABC_1, ABC_2, . . . , ABC_n, . . . , NBC_1, NBC_2, . . . , NBC_n, . . . , UPN_1, UPN_2, . . . , UPN_n, based upon instructions received from the AMS 805. Each programming channel comprises entertainment programming and one or more advertising avails within which the television service provider is to insert advertisements. The AIS 801 splits each incoming programming channel into a plurality of presentation channels, such as by passing the incoming programming channels through audio/video splitters (not shown).

The AMS 805 is coupled to a demographic database 809 and a subscriber billing records database 807, wherein the demographic database 809 may be one of the aforementioned commercially available databases having demographic information about subscribers.

The AIS 801 and the AMS 805 both are connected to a distribution network 813. The AIS 801 provides the multiplicity of presentation channels to the distribution network 813 and the AMS 805 provides instructions about advertising group associations of STBs, e.g., the afore described advertising group maps and channel maps, via an AMS_STB interface 811.

The AMS 805 also is connected to a broadband interface 815 via a mapping subsystem 817, wherein the mapping subsystem 817 assists in mapping different channels to different programming, e.g., STB group mapping.

The broadband interface 815 is connected to one or more subscribers 825 via an access network 819. In one embodiment, each subscriber 825 has an STB for the reception of entertainment programming and advertising.

The AIS 801 is responsible for creating n presentation channels from each selected programming channel, each presentation channel containing targeted advertisements corresponding to the presentation channel's advertising group. The AIS 801 forms the presentation channels by "replicating" the programming channel into a plurality of presentation channels and inserting targeted advertisements into the advertisement avails in the presentation channels. In order to accomplish this targeted advertisement insertion, the AIS 801 receives from the AMS 805 instructions on which advertisements should go into which avails in each of the presentation channels. These instructions are derived from consultation with the queues as previously described. The AMS 805 also supplies instructions to the AIS 801, with reference to matching advertisements to avails, based on the prior sale and scheduling of those avail/advertisements combinations.

The AIS 801 must report to the AMS 805 exactly which advertisements were played in which avails and in which presentation channels such that the purchaser of the advertisement/avail combination can verify that the advertisement was successfully inserted and be billed for the completed transaction.

The AMS 805 has direct access to subscriber records, e.g., subscriber billing records. The subscriber billing records 807 provide the AMS 805 with the information regarding subscribers necessary for determining subscriber profiles and for the targeting of advertisements. For example, in order to optimally utilize the demographic data, a subscriber's ZIP+4 information is needed, and this information is derived from the actual physical address of the subscriber stored in the subscriber billing records 807.

To utilize the system of FIG. 4 in a switched digital video environment, a Media Access Control Identification (MAC_ID) of the STB (i.e., a unique identification of a particular STB) of each subscriber will also be needed. The unique MAC ID is used by the broadband interface 815 to identify which STB is sending or is receiving information. The MAC ID is needed so that the STB itself may be 'informed' about the relevant advertising group. As mentioned above, in one embodiment, a single and complete presentation channel map will be broadcast from a broadband terminal to many STBs. The individual STBs will compute their own individual channel maps based on the group to which they belong.

It is to be noted that increasing the number of presentation channels necessary to accomplish targeted advertising also results in an increased number of channels (i.e., VPI/VCIs) entering and switched by the broadband interface 815, and potentially received by the STB. The broadband interface 815 uses the presentation channel map such that it knows which actual presentation channel corresponds to each VPI/VCI. This map is also sent to the STBs so that the STBs can form their own individual channel maps according to their group, as previously described. The map between channels and VPI/VCIs is generally 'synchronized' between the broadband interface 815 and STB such that a channel change at the STB results in the correct switching of the presentation channel by the broadband interface 815.

As mentioned above, the presentation channel map is communicated to the broadband interface 815 via the mapping interface 817. The AMS 805, alternately, may contain the advertising grouping information about subscribers (and about their STBs).

As avails are determined in each presentation channel, the AMS 805 consults the queue corresponding to that presentation channel to determine which advertisement is to be inserted into that avail and informs the AIS 801. The AIS retrieves the advertisement from the large volume memory 803 and inserts it into the avail in the presentation channel.

There are numerous ways in which the advertisements can be inserted into the presentation channels that would be readily apparent to persons of skill in the related arts. For instance, a digitally controlled video switch may simply switch the source between the presentation channel and an advertising stream (from the large volume memory 803) at the beginnings and ends of avails. This insertion can also be accomplished using a number of commercially available units including those produced by the Sea Change Corporation and by nCube of Foster City, Calif., U.S.A.

The various blocks shown in FIG. 4 may be implemented by any reasonable circuitry, including, but not limited to, a programmed general purpose computer, a digital signal processor, an application specific integrated circuit, analog circuitry, a remote state machine or any combination of the above.

Countless alterations are possible in practicing the present invention. Depending upon a particular household, the individual advertising map created for the STB may be more complex than those illustrated in FIGS. 1A-1C, so that the STB selects presentation channels corresponding to different advertising groups depending on additional conditions such as time of day or the particular program. For instance, let us consider an example in which advertising group C is designed to probabilistically present advertisers with males between the ages of 21 and 39, while advertising group B is designed to probabilistically present advertisers with females between the ages of 21 and 39. If a household comprises a husband (who is most likely to be the viewer when the STB is tuned into a sports channel such as ESPN) and a wife (who is more likely to be the viewer when the STB is tuned into a programming channel like LIFETIME), the individual channel map for that subscriber should be different than for a household comprising two men rather than a husband and wife. Thus, the channel map for the former household may select the presentation channel corresponding to advertising group C (i.e., ESPN_C) for programming channel ESPN, and select the presentation channel corresponding to advertising group B (i.e., LIFETIME_B) for programming channel LIFETIME. The channel map for the latter household, on the other hand, may select the presentation channel corresponding to advertising group C for both ESPN and LIFETIME.

Alternately or additionally, the individual group map may be time-of-day dependent. For instance, if it is somehow probabilistically determined that, for a particular subscriber household, one or more viewers within a certain demographic category are likely to view the television during a certain time of day while individuals of a different demographic category view the television at a different time of day, the individual advertising map for that STB could include time dependent criteria.

Ordinarily, the advertising groups would comprise mutually exclusive sets of subscribers. However, it is possible for some overlap if additional criteria as discussed above are incorporated into the individual STB channel maps as long as the situation is avoided where one subscriber node belongs to two different advertising groups for the same time period and programming channel.

While the invention has hereinabove been described in connection with advertising in television service delivery systems, it can be applied in connection with the insertion of any data into any media stream regardless of sources as long as the information stream passes through a circuit that can perform the functions described above of the advertisement insertion module 801. Thus, for instance, the invention is equally applicable to analog cable, regular earth-based broadcast television, the Internet, or a data stream from any type of memory device, including compact disks, digital video disks, other optical media, magnetic disks, ROM, RAM, etc.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of transmitting streaming media and advertisements from at least one server to viewers at a plurality of viewer nodes, the method comprising:
   creating a plurality of viewer groups, members of the viewer groups being based on at least one characteristic of the viewers, the at least one characteristic being relevant to advertising;
   assigning each viewer node to one of the plurality of viewer groups, wherein the assigning includes creating an advertising group map disclosing an advertising group to which each viewer belongs and transmitting the advertising group map to each viewer node;

receiving at the at least one server at least one media stream including television programming;

forming a plurality of presentation channels, each presentation channel corresponding to one of the viewer groups, by replicating the at least one media stream, each presentation channel including the television programming and advertisements, wherein the advertisements replace previously scheduled advertisements; and transmitting each of the presentation channels to at least one viewer node in the viewer group corresponding to the respective presentation channel.

2. The method of claim 1, wherein each viewer group comprises a set of viewers that is mutually exclusive of each other viewer group.

3. The method of claim 1, wherein the advertisements included in one of the plurality of presentation channels is selected from a queue of advertisements corresponding to the assigned viewer group of the viewer node that requested the television programming.

4. The method of claim 1, wherein the at least one viewer node includes a set top box through which the request for the television programming is made.

5. The method of claim 1, wherein the at least one characteristic includes probabilistic demographic information of the viewers.

6. The method of claim 1, wherein the at least one characteristic is based in part on the address of the viewers.

7. The method of claim 1, wherein the at least one characteristic is based in part on socio-economic characteristics of the viewers.

* * * * *